June 16, 1953 — R. L. GATES — 2,642,261
VENT VALVE
Filed June 6, 1947
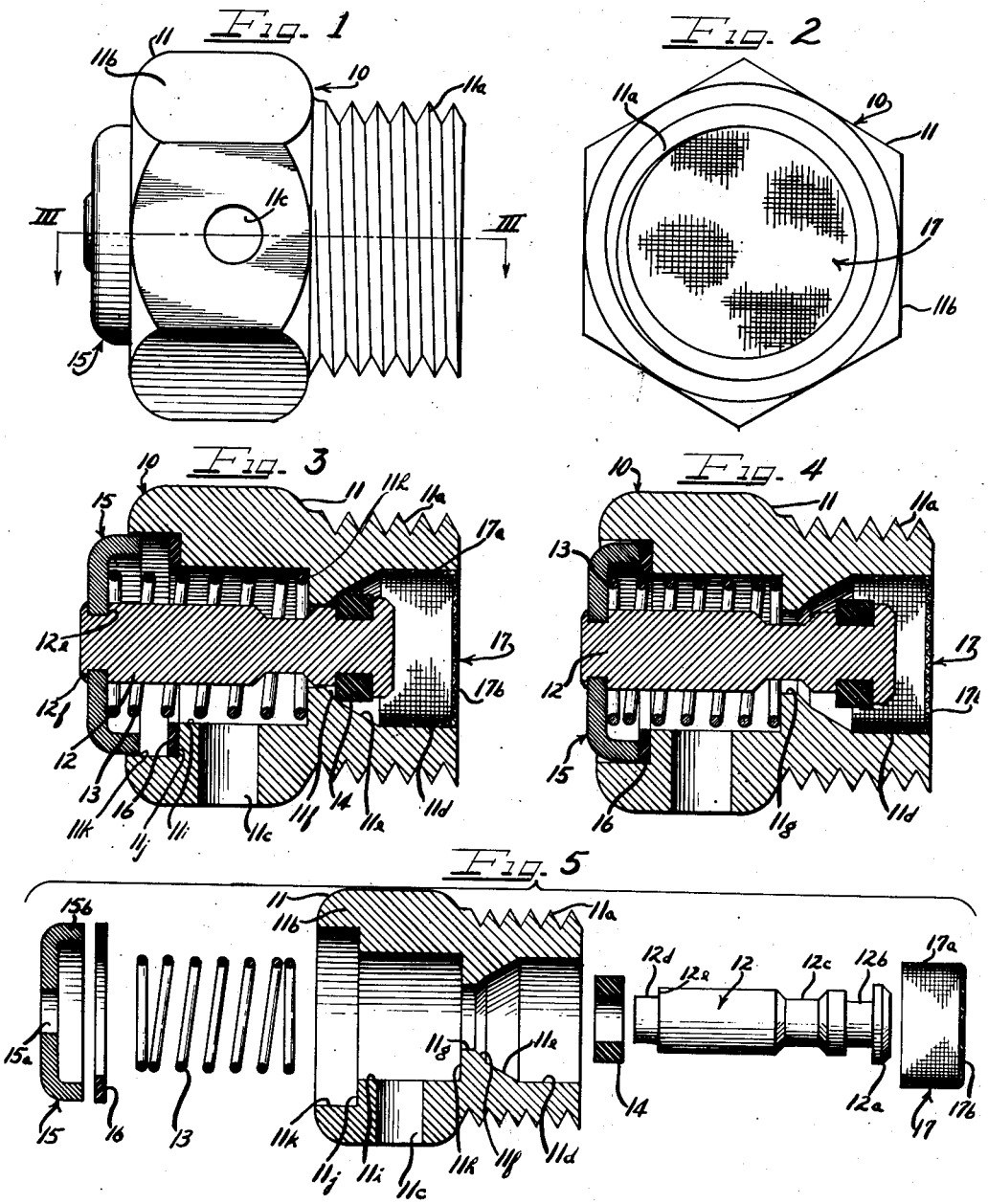
Inventor
RICHARD L. GATES
by The Firm of Charlesworth, Attys.

Patented June 16, 1953

2,642,261

UNITED STATES PATENT OFFICE 2,642,261

VENT VALVE

Richard L. Gates, Dayton, Ohio, assignor to Curtis Automotive Devices, Inc., Dayton, Ohio, a corporation of Ohio Application June 6, 1947, Serial No. 752,867

1 Claim. (Cl. 251—137)

This invention relates to spring pressed valves especially adapted for purging air from hot water radiators or the like, and specifically the invention deals with a vent valve with an internal protected valve seat and with a threaded inlet end that can be deformed without warping the valve seat.

This application is a continuation in part of my copending application Serial No. 681,577 entitled: "Vent Valve," filed July 5, 1946, now Patent No. 2,577,654, issued December 4, 1951.

The vent valve of this invention, like the valve disclosed and claimed in the aforesaid parent application, includes an open-ended screw plug body slidably receiving a solid valve member. However, the body of the present valve has a protected internal seat that cannot become fouled with piping compound or the like. The valve seat separates relatively large bores extending inwardly from opposite ends of the body and is therefore positioned at the thickest portion of the body to resist warpage. The internal valve seat makes possible the use of a very small diameter valve member thereby saving an additional amount of metal and at the same time maintaining ample flow capacity. The valve member carries a separate cap fixed thereon for coaction with a sealing washer so that one end of the plug body will be sealed whenever the valve member is depressed to open the valve for drainage.

It is therefore an important object of this invention to provide a vent valve of the type disclosed and claimed in my parent application Serial No. 681,577 but requiring less metal and having an internal protected valve seat.

Another object of the invention is to provide a valve especially adapted for purging radiators and the like which is composed of a threaded plug-like body having an internal valve seat separating large diameter bores together with a valve plug slidable through the valve seat and carrying a resilient sealing washer for engaging the seat and a spring surrounding the plug coacting with the cap on the plug to hold the sealing washer against the seat.

A still further object of the invention is to provide a spring loaded purge valve having a stamped, button-like end cap coacting with a sealing washer to close one end of the valve body when the other end thereof is opened for a purging operation.

Another object of the invention is to provide a valve of relatively high flow capacity having an internal valve seat at the thickest portion of the body and arranged relative to a threaded end on the body so that the end can deform without warping the seat.

Another object of the invention is to provide a vent valve with a reduced valve head area so that a relatively light spring load on the head will result in a greater unit sealing pressure without rendering the valve difficult to operate.

A specific object of the invention is to provide a vent valve for purging air from hot water radiators or the like composed of a screw plug type housing with an internal valve seat and a screen in the inlet end thereof to protect the seat from sediment and the like.

Other and further objects of the invention will be apparent to those skilled in the art from the following detailed description of the annexed sheet of drawings which, by way of a preferred example only, illustrates one embodiment of the invention.

On the drawings:

Figure 1 is a side elevational view of a vent valve according to this invention.

Figure 2 is an end elevational view of the inlet end of the valve of Figure 1.

Figure 3 is an axial cross-sectional view taken along the line III—III of Figure 1.

Figure 4 is a view similar to Figure 3 but showing the valve in opened position.

Figure 5 is an exploded axial sectional view, with parts in side elevation, showing the manner in which the valve parts are assembled.

As shown on the drawings:

The vent valve 10 is composed of a hollow open-ended plug-like body or housing 11, a solid valve plug 12, a spring 13, a seal ring 14 on one end of the plug, a cap 15 on the other end of the plug, a sealing washer 16 coacting with the cap 15, and a screen 17 for the inlet end of the body.

The body 11 has a tapered externally threaded end portion 11a in the form of a circular shank for threaded insertion in the vent port of a radiator or the like. A polygonal head 11b is provided on the body adjacent the large end of the tapered threaded portion 11a and a radially extending hole 11c is formed through the polygonal head to provide the drain passageway for the body.

As best shown in Figure 5, the body 11 has a cylindrical bore 11d extending inwardly from the threaded end thereof to a tapered bore 11e which converges to a more acutely tapered bore 11f. The bore 11f converges to a cylindrical bore or passage 11g at about the inner end of the threaded portion. A flat radially extending shoulder 11h connects the bore 11g with a larger diameter bore 11i extending through a major portion of the polygonal head 11b of the body. A second shoulder 11j extends radially outward from the bore 11i to an enlarged counterbore 11k in the end face of the polygonal head portion. It will be evident, therefore, that the connecting passage 11g between the bores 11d and 11i is well inwardly from both open ends of the body and is surrounded by body metal having the greatest thickness in the entire body. The beveled mouth 11f of this passage 11g serves as a valve seat and it, too, is surrounded by a very thick body wall. The beveled bore 11e serves as a guide to the seat 11f.

The valve plug 12 is cylindrical and fits through the passage 11g except for an end head 12a thereon. This end head has a diameter slightly larger than the passage 11g. A groove 12b is provided in the plug 12 adjacent the head 12a to receive the sealing ring 14. This ring 14 is adapted to be slipped over the plug head or along the length of the plug into the groove 12b to be bottomed against the head 12a which extends almost to the outer circumference of the ring. A second groove 12c is provided in the plug along a portion of its length that is disposed in the passage 11g of the body when the valve is opened, thereby giving an increased flow capacity through the passage. A reduced diameter end portion 12d is provided on the plug to extend through the aperture 15a of the stamped cap 15. The cap is bottomed on a shoulder 12e of the plug at the end of the reduced diameter portion. The free end of the reduced diameter portion 12d is peened or spun over the face of the cap 15 at 12f to lock the cap on the shoulder 12e.

The sealing washer 16 is composed of compressed fiber, rubber, or the like non-metallic sealing material and is seated in the counterbore 11k against the shoulder 11j of the body. The cap 15 has a skirt 15b with an end face adapted to sealingly engage the washer 16 when the valve is opened as shown in Figure 4.

The spring 13 surrounds the plug 12 and is compressed between the shoulder 11h of the body and the cap 15. The spring fits freely in the bore 11i of the body.

The screen 17 is preferably cup-shaped with a side wall 17a sized for tightly engaging the wall of the bore 11d and with an end wall 17b spanning the inlet end of the body. If desired, of course, the side wall 17a could be quite short, and bottomed in a shallow counterbore (not shown) in the mouth of the bore 11d. Alternately, the screen can be in the form of a flat disk brazed or soldered on the end face of the body. The body 11 and the plug 12 are inexpensively formed screw machine parts designed to necessitate a minimum amount of metal while at the same time providing maximum strength and resistance to deformation of portions that should remain true. The threaded portion 11a can be made with a relatively thin wall and can deform to accommodate a sealing fit in a tapered bore. However, deformation of this portion will not deform the valve seat 11f which is surrounded by a wall portion of major thickness. The valve plug 12 is of relatively small diameter to save appreciable amounts of metal and the groove 12c therein increases the flow capacity of the valve since it is disposed in that portion of the plug which extends on both sides of the valve seat and restricted passage 11g to give increased clearance for flow from the inlet to the outlet.

The cap 15 has a free sliding fit in the bore 11k. The spring acts on the cap to move it to the outer end of the bore 11k and to seat the sealing ring 14 on the valve seat 11f. As this sealing ring moves toward the valve seat 11f it is guided centrally of the valve seat by the tapered guiding bore 11e.

To open the valve, the cap 15 is depressed into the bore 11k until its skirt 15b sealingly engages the sealing washer 16 thereby closing the head end of the body but moving the sealing ring 14 off of its seat. The cap, by being bottomed on the sealing washer 16, centers the plug 12 in the passageway 11g and the groove 12c of the plug forms an ample conduit path from the inlet bore 11d to the bore 11i of the body whereupon fluid will drain through the outlet 11c. When the cap 15 is released the spring, of course, will return the valve to the closed position of Figure 3.

The valve seat 11f is protected from sediment by being inside of the body and is further protected by the filter screen 17.

The parts of the valve are easily assembled as shown in Figure 5. As therein shown, the sealing ring 14 is disposed over the plug to be seated in the groove 12b. The plug with the sealing ring thereon is then inserted into the body and the spring 13 is disposed around the plug in the bore 11i of the body. The sealing washer 16 is bottomed on the shoulder 11j and the end cap 15 is secured on the reduced portion 12d of the plug. The screen 17 is pressed into the inlet bore 11d and the assembly is ready for use.

From the above descriptions it will be understood that this invention provides a vent valve assembly which automatically seals one open end of a valve body when the other end is opened, and which has an internal valve seat surrounded by a sufficient amount of body metal to resist distortion even though other portions of the body are distorted.

It will, of course, be understood that various details of construction may be varied through a wide range without departing from the principles of this invention and it is, therefore, not the purpose to limit the patent granted hereon otherwise than as necessitated by the scope of the appended claim.

I claim as my invention:

A valve comprising a body having an exteriorly threaded tapered cylindrical shank at one end thereof and a head at the other end thereof, said head having a bore therein terminating in a shoulder and a counterbore at the outer end thereof terminating in a second shoulder, said threaded shank having a bore therethrough terminating in a frusto-conical valve seat and a reduced diameter passage adjacent said first shoulder, a laterally extending port in said head communicating with the bore therein, a solid valve plug in said body having a reduced diameter shank portion extending through said reduced diameter passage into the shank bore and terminating in a radially enlarged peripheral shoulder, said plug shank portion having a second radially enlarged peripheral shoulder axially spaced above the first shoulder for entry into said reduced diameter passage, a cap on said plug slidable in said counterbore, a sealing washer bottomed on said second shoulder in the counterbore and coacting with the cap to close one end of the housing, a second sealing washer mounted on said plug intermediate said shoulders, and a spring surrounding said plug and held under compression between said cap and said first shoulder for urging said second sealing washer against said frusto-conical valve seat with said second shoulder positioned within said reduced diameter passage, said spring being located in the chamber which is drained by said laterally extending port.

RICHARD L. GATES.

References Cited in the file of this patent

UNITED STATES PATENTS

| Number | Name | Date |
|---|---|---|
| 656,849 | Minor | Aug. 28, 1900 |
| 862,009 | Newell | July 30, 1907 |
| 1,238,926 | Long | Sept. 4, 1917 |
| 1,302,829 | Muir | May 6, 1919 |
| 1,333,506 | Perry et al. | Mar. 9, 1920 |
| 1,378,426 | Sackett | May 17, 1821 |
| 1,403,509 | Long | Jan. 17, 1922 |
| 1,462,263 | Chaney | July 17, 1923 |
| 1,503,656 | Long | Aug. 5, 1924 |
| 1,551,439 | Stoms | Aug. 25, 1925 |
| 1,682,154 | Van House | Aug. 28, 1928 |
| 2,336,924 | Cordis | Dec. 14, 1943 |
| 2,401,129 | Arnold | May 28, 1946 |
| 2,408,541 | Wilson | Oct. 1, 1946 |
| 2,577,654 | Gates | Dec. 4, 1951 |